(12) United States Patent
Seon

(10) Patent No.: US 7,889,057 B2
(45) Date of Patent: Feb. 15, 2011

(54) RFID READER

(75) Inventor: Jong-Kug Seon, Anyang (KR)

(73) Assignee: LS Industrial Systems Co., Ltd., Seoul (KR)

( * ) Notice: Subject to any disclaimer, the term of this patent is extended or adjusted under 35 U.S.C. 154(b) by 1224 days.

(21) Appl. No.: 11/463,706

(22) Filed: Aug. 10, 2006

(65) Prior Publication Data

US 2007/0041476 A1 Feb. 22, 2007

(30) Foreign Application Priority Data

Aug. 16, 2005 (KR) ...................... 10-2005-0074920

(51) Int. Cl.
H04Q 5/22 (2006.01)
(52) U.S. Cl. .................. 340/10.2; 340/10.3; 340/825.71
(58) Field of Classification Search ................ 340/10.1, 340/825.72, 10.3, 825.69, 825.71, 825.58
See application file for complete search history.

(56) References Cited

U.S. PATENT DOCUMENTS

| | | | |
|---|---|---|---|
| 4,926,130 A * | 5/1990 | Weaver | ....................... 327/105 |
| 5,859,570 A | 1/1999 | Itoh et al. | |
| 6,476,708 B1 * | 11/2002 | Johnson | .................... 340/10.34 |
| 6,639,509 B1 * | 10/2003 | Martinez | ................... 340/10.4 |
| 6,905,074 B2 * | 6/2005 | Charrat | ...................... 235/492 |
| 6,967,514 B2 * | 11/2005 | Kizer et al. | ................. 327/175 |
| 2002/0106038 A1 | 8/2002 | Lee et al. | |
| 2005/0201450 A1 * | 9/2005 | Volpi et al. | .................. 375/150 |
| 2006/0097874 A1 | 5/2006 | Salesky et al. | |

FOREIGN PATENT DOCUMENTS

| | | |
|---|---|---|
| JP | 2002-109480 | 4/2002 |
| JP | 2005-217967 | 8/2005 |
| JP | 2008-519536 | 6/2008 |
| KR | 95-4839 | 6/1995 |
| KR | 20020064529 | 8/2002 |
| TW | 588517 | 5/2004 |

OTHER PUBLICATIONS

English Language Abstract of KR 2002-0064529.

* cited by examiner

*Primary Examiner*—Vernal U Brown
(74) *Attorney, Agent, or Firm*—Greenblum & Bernstein, PLC

(57) ABSTRACT

Provided are an RFID reader reading data from an RFID tag using a wireless connection over a specified frequency bandwidth, including a transmitting unit synthesizing sequentially and cumulatively frequency control signals generated every clock, mixing the synthesized specific frequency signal and a fixed frequency signal, and as a result outputting an RF signal.

13 Claims, 7 Drawing Sheets

RFID READER

RELATED APPLICATION

The present disclosure relates to subject matter contained in priority Korean Application No. 10-2005-0074920, filed on Aug. 16, 2005, which is herein expressly incorporated by reference in its entirety

BACKGROUND OF THE INVENTION

1. Field of the Invention

The present invention is related to a radio frequency identification(RFID) reader, and more particularly to a radio frequency identification capable of lowering power consumption and reducing a size by employing receiving and transmitting units of which structures are simplified.

2. Description of the Background Art

In a typical radio frequency identification (RFID) system, objects are tagged with tiny radio tags (transponders) that carry certain data about the objects. The tags (transponders) transmit this data, through radio waves, to nearby readers, which collect and process the data accordingly. These transactions between RFID tags and the readers enable a multitude of applications that require efficient detection, identification, and tracking of objects.

FIG. 1 is a block diagram showing a configuration of a conventional RFID reader. As shown in FIG. 1, the conventional RFID reader includes a controlling unit 100, a transmitting unit 110, and a receiving unit 120.

The transmitting unit 110 includes a frequency changing unit 111 changing a frequency by virtue of the controlling unit 100, a mixer 112 mixing a frequency control signal output from the controlling unit 100 and a frequency changed by the frequency changing unit 111, an amplifying unit 113 amplifying a mixed signal output from the mixer 112 to a specified level. At this point, the frequency changing unit 111 generally uses a PLL (phase locked loop) method. That is, the transmitting unit 110 modulates directly the frequency control signal output from the controlling unit 100 and a carrier frequency using an ASK (amplitude shift keying) method.

The receiving unit 120 includes a low-noise amplifying unit 121, mixers 123 and 124, a phase shifting unit 122, low pass filters 125 and 126, amplifying unit 127 and 128, high pass filters 129 and 130, and analog-to-digital converters 131 and 132.

The low-noise amplifying unit 121 amplifies a signal received from an RFID tag (not shown) to a low-noise level.

The phase shifting unit 122 shifts a phase of the changed frequency output from the frequency changing unit 111 by 90 degrees.

The mixer 123 mixes a phase-shifted-by-90 degree changed frequency and a signal output from the low-noise amplifying unit 121 to output an in-phase signal. The mixer 124 mixes a changed frequency output from the frequency changing unit 111 and a signal output from the low-noise amplifying unit 121 to output a quadrature-phase signal.

The low pass filters 125 and 126 pass the in-phase signal and the quadrature-phase signal output from the mixers 123 and 124 which are below a certain level, respectively. The amplifying units 127 and 128 amplify signals output from the low pass filters 125 and 126 to specific levels, respectively.

The analog-to-digital converters 131 and 132 convert the signals output from the amplifying unit 127 and 128 into digital signals.

The controlling unit 100 controls the changing of the frequency by the frequency changing unit 111, and generates the frequency control signal to be transmitted to the RFID tag, The controlling unit 100 analyzes a digital signal output from the receiving unit 120, and as a result recognizes data received from the RFID tag.

However, the digital data generated in the conventional RFID reader contain a lot of subharmonic components due to particular impulse characteristics, thus deteriorating frequency characteristics.

The deterioration in the frequency characteristic causes a problem of lowering performance of the RFID reader in a frequency environment where the channel bandwidth is a scarce and expensive resource.

The RFID reader using a frequency hopping method changes a central frequency of transmission signal to a preset frequency by using the PLL method. The PLL method needs a setting time for changing the frequency.

The setting time causes interruption of data communication between the RFID tag and the RFID reader, thus deteriorating the recognition rate of the RFID tag by the RFID reader.

In the conventional RFID reader, the transmitting unit uses the direct modulation method in which one PLL method is used and the receiving unit uses the direct demodulation method in which one PLL method is used.

Accordingly, the frequency of the signal received by the RFID reader and the level of the signal demodulated through a phase difference of the fixed frequency output from the PLL or by the Doppler effect change with 90 degree phase shift being made. The phase difference is demodulated using the in-phase and quadrature-phase method.

However, The demodulation using the In-phase and quadrature-phase requires that the same component be provided to each of two paths, thus making the configuration of the RFID reader complicated and increasing power consumption.

BRIEF DESCRIPTION OF THE INVENTION

An object of the present invention is to enable a transmitting unit to synthesize a frequency at a high speed using a direct digital frequency synthesizer (DDFS) when modulating a transmission signal in an RFID reader.

Another object of the present invention is to enable a transmitting unit to minimize a bandwidth issue due to an unnecessary frequency component generated during the ascending and descending of a transmission signal after modulation by performing a pulse shaping through adjusting of ascending and descending times of the transmission signal when modulating the transmission signal in an RFID reader.

Another object of the present invention is to enable a receiving unit to simplify a structure of an RFID reader and reduce power consumption of the RFID reader by performing demodulation using non-zero in-phase and quadrature-phase frequency method in which a fixed frequency of a transmitting unit and a frequency of a transmission signal transmitted from an RFID tag are used, when demodulating the transmission signal transmitted from the RFID tag.

Another object of the present invention is to enable a receiving unit to reduce a level of amplitude after demodulation and improve data reception in an RFID reader by multiplying a transmission signal and demodulating the transmission signal when demodulating the transmission signal transmitted from an RFID tag.

Another object of the present invention is to enable an receiving unit to improve data reception in an RFID reader by performing demodulation after detecting a level of a transmission signal using root-mean square (RMS) method when demodulating the transmission signal transmitted from an RFID tag.

According to an aspect of the present invention, there is provided an RFID reader reading data from an RFID tag using a wireless connection over a specified frequency bandwidth, including a transmitting unit synthesizing sequentially and cumulatively frequency control signals generated every clock, mixing the synthesized specific frequency signal and a fixed frequency signal, and as a result outputting an RF signal.

According to another aspect of the present invention, there is provided an RFID reader reading data from an RFID tag using a wireless connection over a specified frequency bandwidth, including a receiving unit mixing a signal received from the RFID tag and a fixed frequency signal, converting the mixed signal into a digital signal, and as a result extracting data.

According to another aspect of the present invention, there is provided an RFID reader reading data from an RFID tag using a wireless connection over a specified frequency bandwidth, including a transmitting unit synthesizing sequentially and cumulatively frequency control signals generated every clock, mixing the synthesized specific frequency signal and a fixed frequency signal, and as a result outputting an RF signal, and a receiving unit mixing a signal received from the RFID tag and the fixed frequency signal, converting a mixed signal into a digital signal, and as a result extracting data.

According to another aspect of the present invention, there is provided an RFID reader reading data from an RFID tag using a wireless connection over a specified frequency bandwidth, including a transmitting unit pulse-shaping a frequency control signal generated every clock, mixing a pulse-shaped specific frequency signal and a changed frequency, and as a result outputting an RFID signal.

According to another aspect of the present invention, there is provided an RFID reader reading data from an RFID tag using a wireless connection over a specified frequency bandwidth, including a receiving unit mixing a frequency of a signal received from the RFID tag by way of squaring the frequency, converting a mixed signal into a digital signal, and as a result extracting data.

According to another aspect of the present invention, there is provided an RFID reader reading data from an RFID tag using a wireless connection over a specified frequency bandwidth, including a transmitting unit pulse-shaping a frequency control signal generated every clock, mixing a pulse-shaped specific frequency signal and a changed frequency, and as a result outputting an RFID signal, and a receiving unit mixing a frequency of a signal received from the REID tag by way of squaring the frequency, converting a mixed signal into a digital signal, and as a result extracting data.

According to another aspect of the present invention, there is provided an RFID reader reading data from an RFID tag using a wireless connection over a specified frequency bandwidth, including a receiving unit detecting a level of a signal received from the RFID tag, converting the level of the signal into a digital signal, and as a result extracting data.

According to another aspect of the present invention, there is provided an RFID reader reading data from an RFID tag using a wireless connection over a specified frequency bandwidth, including, a transmitting unit pulse-shaping a frequency control signal generated every clock, mixing a pulse-shaped specific frequency signal and a changed frequency, and as a result outputting an RFID signal, and a receiving unit detecting a level of a signal received from the RFID tag, converting the level of the signal into a digital signal, and as a result extracting data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

A receiving unit of an RFID reader according to embodiments of the present invention is now described which improves data reception in the RFID reader by detecting a level of the transmission signal using a root-mean square (RMS) method and demodulating the level of the transmission signal when demodulating a transmission signal transmitted from an RFID tag.

The RFID reader recognizes an RFID tag identification and data transmitted from the RFID tag when the RFID tag having the identification and the data is within a range of radio which an antenna of the RFID reader transmits. As a result, the RFID reader transmits the data to the host computer through a serial or ethernet connection.

Figure 2:
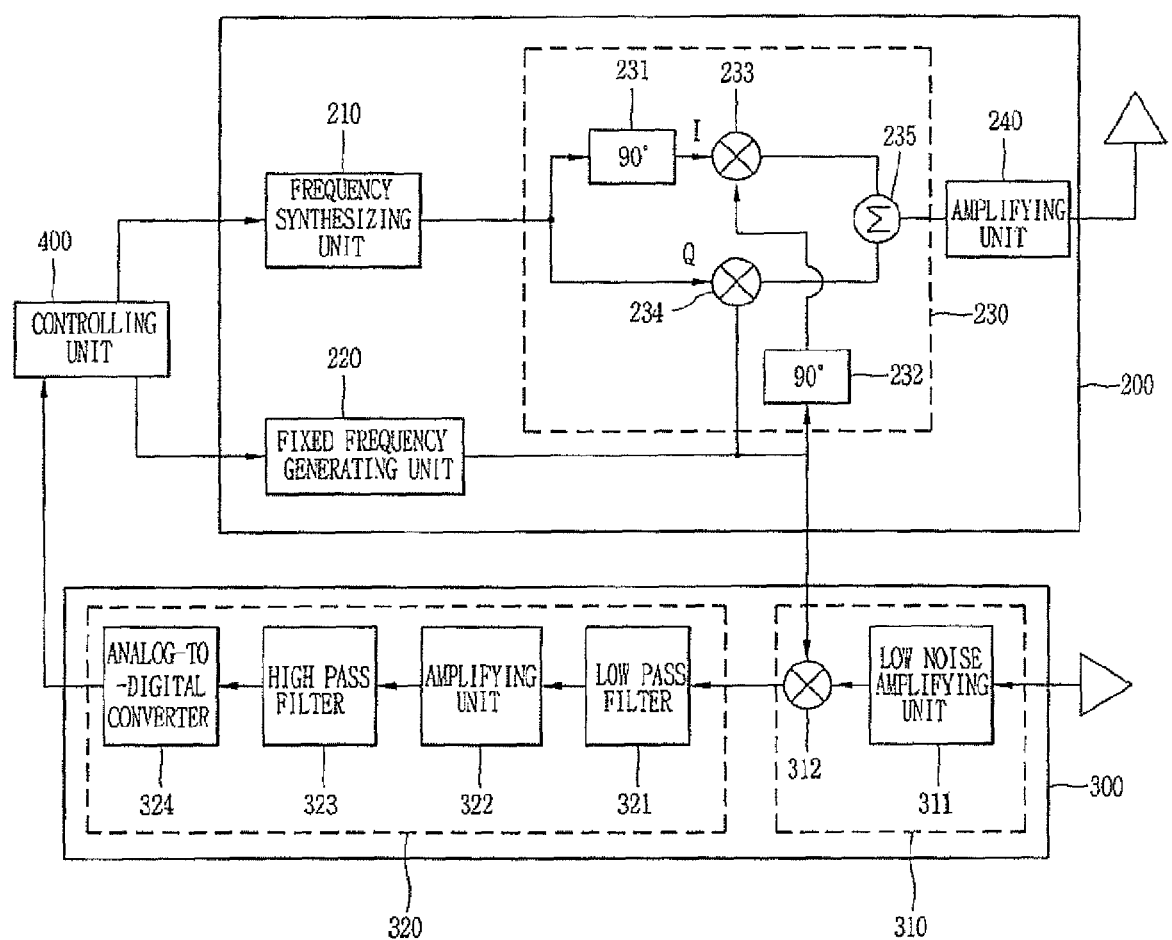
FIG. 2 is a block diagram showing a configuration of the RFID reader according to an embodiment of the present invention.

FIG. 2 is a block diagram showing a configuration of the RFID reader according to an embodiment of the present invention. As shown in FIG. 2, the RF reader includes a transmitting unit 200 which sequentially and cumulatively synthesizes a frequency control signal generated every clock, mixes a synthesized specific frequency signal and a fixed frequency signal and as a result outputs an RE signal, a receiving unit 300 which mixes a signal received from an RFID tag and a fixed frequency signal, converts a mixed signal into a digital signal, and as a result extracts data, and a controlling unit 400 which outputs the frequency control signal which is converted into a digital signal every clock and fixing a frequency to a specific level. The transmitting unit 200 includes a frequency synthesizing unit 210, a fixed-frequency generating unit 220, a modulating unit 230 and an amplifying unit 240.

The frequency synthesizing unit 210 sequentially and cumulatively synthesizes the frequency control signal generated every clock and as a result outputs a specific frequency signal.

The frequency synthesizing unit 210 may include a direct digital frequency synthesizer (DDFS). The DDFS includes an accumulator (not shown) which adds the frequency control signal generated every clock from the controlling unit 400 to a stored value, a ROM (not shown) which stores a digitalized verson of a sine value corresponding to a phase of a signal output from the accumulator and a digital-to-analog converter (not shown) which converts a digital value output from the ROM into an analog value.

At this point, the digital-to-analog converter (not shown) may perform pulse shaping to change ascending and descending times of the digital value output from the ROM to a certain level and as a result may output the analog signal as a specific frequency signal.

Figure 1:
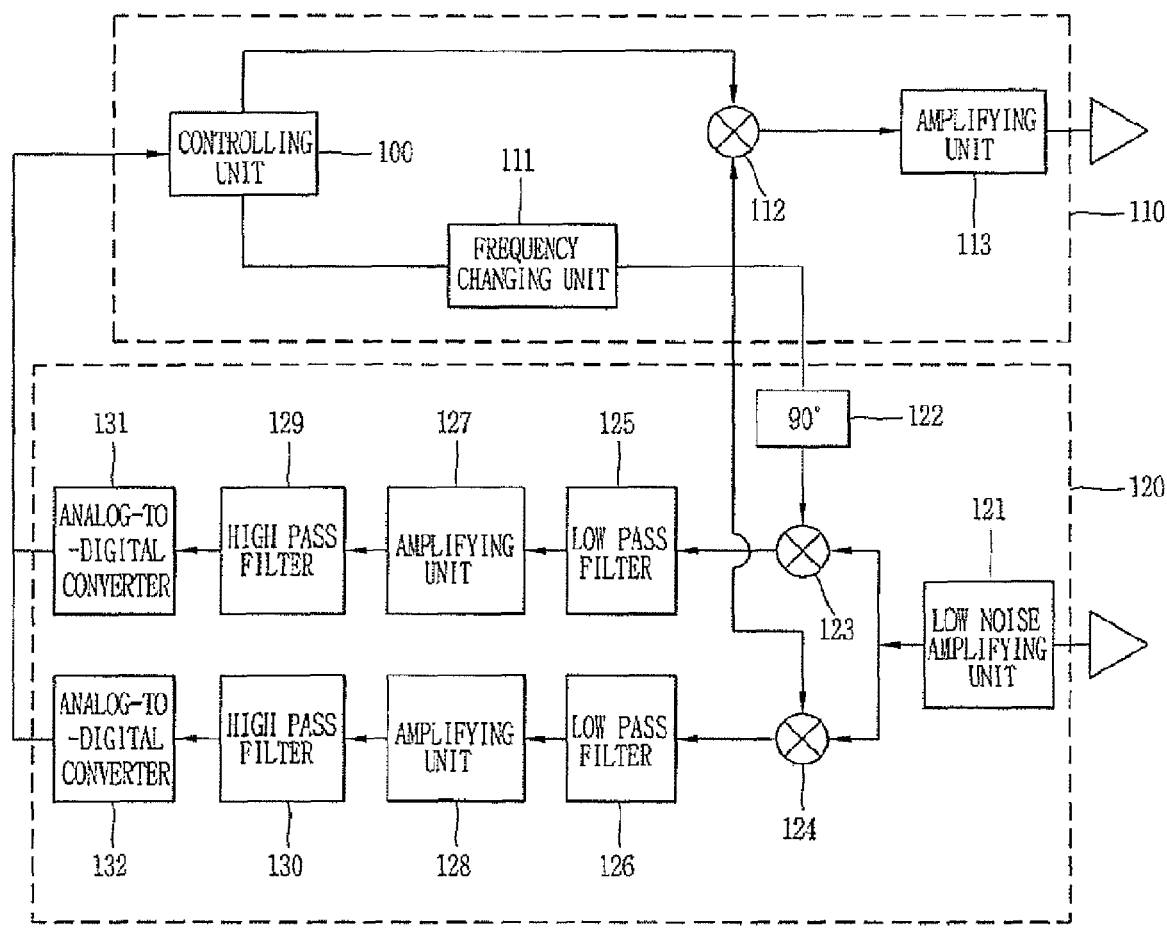
FIG. 1 is a block diagram showing a configuration of a conventional RFID reader.

According to the present invention, a setting time, which is required when performing the frequency hopping using the PLL method, can be minimized by performing the frequency hopping (frequency synthesizing) using the DDFS, not directly controlling the PLL as shown in FIG. 1. This makes it possible to increase telecommunication speed of the RF reader using the frequency hopping, thereby improving a recognition rate of the RFID tag.

The fixed frequency generating unit 220 generates a frequency which is fixed to a specific level by way of a specific control and outputs a generated frequency.

The modulating unit 230 includes first and second phase shifting units 231 and 232, first and second mixer 233 and 234, and an adding unit 235.

The first phase shifting unit 231 shifts a phase of a specific frequency signal output from the frequency synthesizing unit 210 by 90 degrees and as a result outputs an in-phase signal. The second phase shifting unit 232 shifts a phase of a fixed frequency signal output from the fixed frequency signal generating unit 220 by 90 degrees.

The first mixer 233 mixes the in-phase signal of the first phase shifting unit 231 and an output signal of the second phase shifting unit 232. The second mixer mixes a quadrature-phase signal of the specific frequency signal output from the frequency synthesizing unit 210 and the fixed frequency signal.

The adding unit 235 adds signals output from the first and second mixer 233 and 234 and as a result outputs an RF signal.

The amplifying unit 240 amplifies the RF signal output from the modulating unit 230 to a specific level and transmits an amplified RF signal through an antenna.

According to the present invention, problems with a double side band (DSB) method such as low frequency efficiency and channel interference can be solved by making the in-phase and quadrature-phase modulation of the frequency signal synthesized by the frequency synthesizing unit 210 and the fixed frequency signal, thereby giving rise to a single side band (SSB) characteristic.

The receiving unit 300 includes a demodulating unit 310 and a data extracting unit 320.

The demodulating unit 310 includes a low-noise amplifying unit 311 which amplifies a signal received from the RFID tag to a low-noise level and a mixer 312 which mixes a signal output from the low-noise amplifying unit 311 and the fixed frequency output from the fixed-frequency generating unit 220 of the transmitting unit 200.

Figure 3:
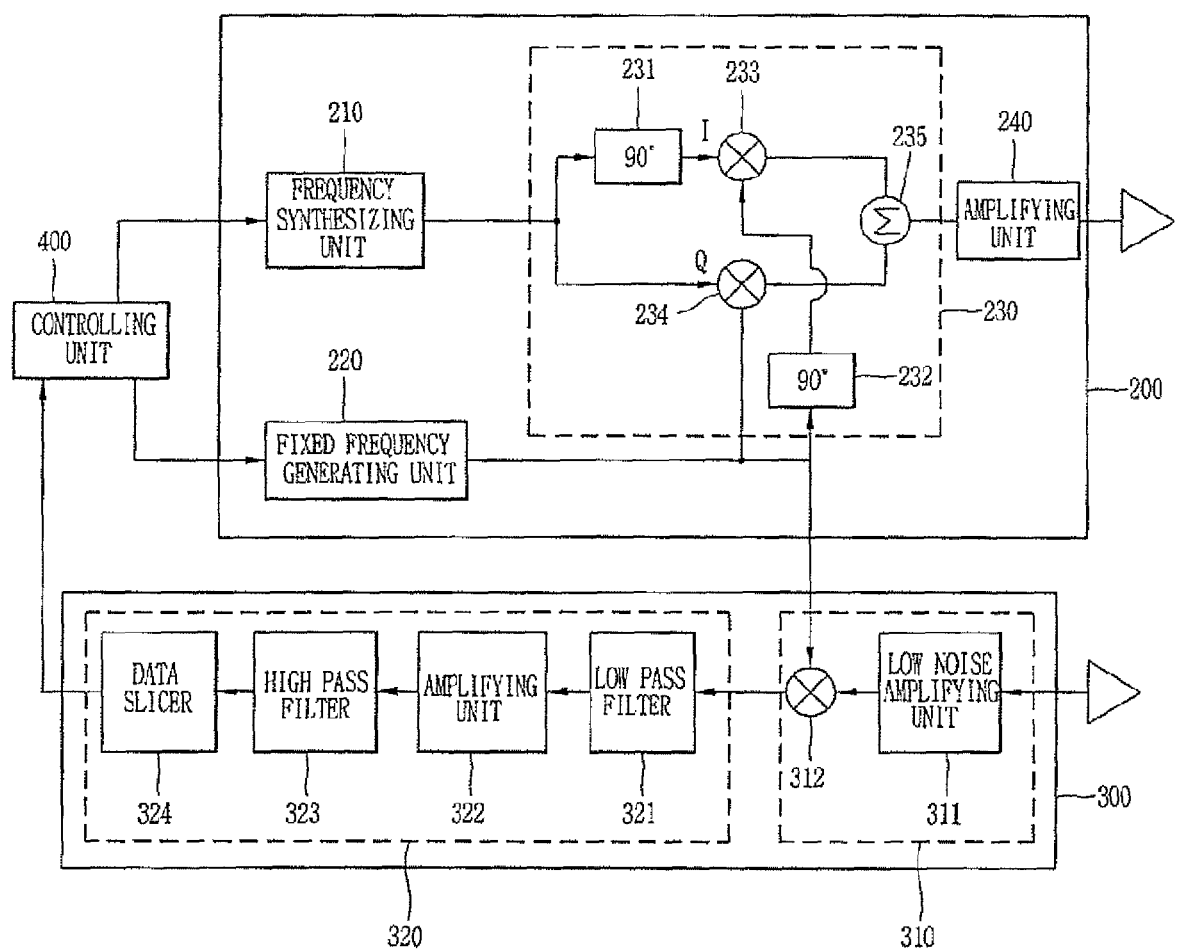
FIG. 3 is a block diagram showing a configuration of the RFID reader according to another embodiment of the present invention.

The data extracting unit 320 includes a low-pass filter 321 which passes a demodulated signal output from the demodulating unit 310 which is below a certain level, an amplifying unit 322 which amplifies a signal output from the low pass filter 321 to a specific level, a high pass filter 323 which passes a amplified signal output from the amplifying unit 322 which is above a certain level, and an analog-to-digital converter 324 which converts a signal output from the high pass filter 323 into a digital signal. The analog-to-digital converter 324, so expensive, increases a cost for manufacturing the RFID reader. So, the data extracting unit 320 may include a data slicer 325, instead of the analog-to-digital converter 324, as shown in FIG. 3.

That is, the data slicer 325 cuts off a signal output from the high pass filter 323 which is above or below a specified level and restores the signal of the specified level to a digital level. This makes it possible to reduce the size and power consumption of the receiving unit.

The transmitting unit 200 generates the fixed frequency signal and the specific frequency signal. The receiving unit 300 receives from the antenna a sum of the specific frequency signal and the fixed frequency signal and demodulates the sum and the fixed frequency signal. The receiving unit 300 filters low and high frequency components which are generated as a result of the demodulation and enables the low frequency component to remain as digital data. Thus it is possible to maintain a specific size of data despite a change in a size of a data signal which is due to a difference in phase between the transmission signal and a reference frequency of the demodulating unit.

Figure 4:
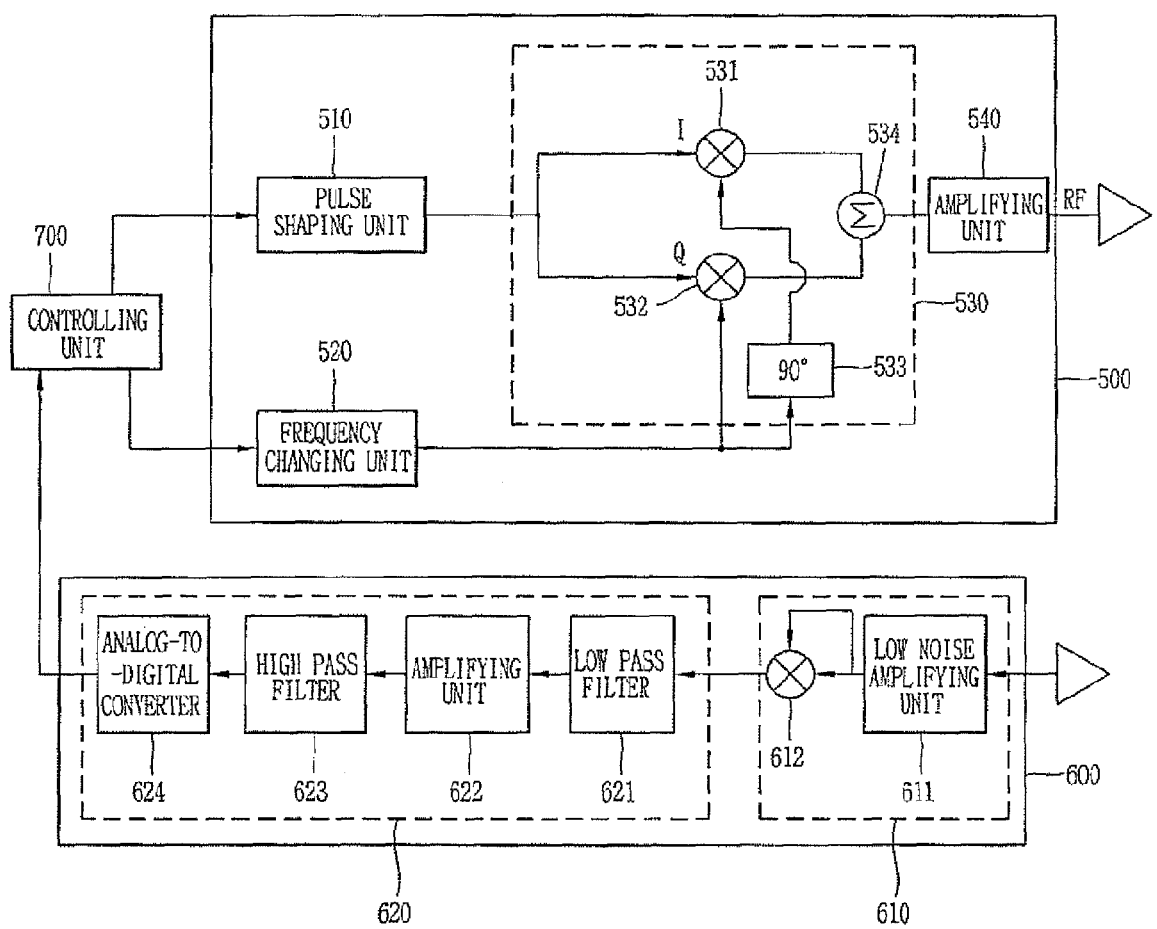
FIG. 4 is a block diagram showing a configuration of the RFID reader according to another embodiment of the RFID reader according to the present invention.

FIG. 4 is a block diagram showing a configuration of another embodiment of the RFID reader according to the present invention. As shown in FIG. 4, the RFID reader includes a transmitting unit 500, a receiving unit 600, and a controlling unit 700.

The controlling unit 700 outputs a frequency control signal which is converted into a digital signal every clock and controls a change of a frequency for phase synchronization.

The transmitting unit 500 pulse-shapes a frequency control signal which is generated every clock and mixes a pulse-shaped specific frequency signal and a changed frequency and as a result outputs an RF signal.

The receiving unit 600 mixes a frequency of a signal received from the RFID tag by way of squaring the frequency. The receiving unit 600 converts a mixed signal into a digital signal and extracts data. The transmitting unit 500 includes a pulse shaping unit 510, a frequency changing unit 520, a modulating unit 530, and an amplifying unit 640.

The pulse shaping unit 510 performs a pulse shaping through adjusting ascending and descending times of a frequency control signal which is generated every clock, and as a result outputs a specific frequency signal. That is, the pulse shaping unit 510 minimizes a bandwidth issue occurring after modulation of the carrier frequency, due to a unnecessary frequency component which is generated when the frequency control signal (digital data) output from the controlling unit 700 ascends and descends. The frequency changing unit 520 is controlled by the controlling unit 700 to change the frequency. The modulating unit 530 mixes a changed frequency output from the frequency changing unit 520 and a specific frequency signal output form the pulse shaping unit 510.

The amplifying unit 540 amplifies a signal output from the modulating unit 530 to a specific level and transmits an amplified signal through the antenna.

The modulating unit 530 includes a phase shifting unit 533, first and second mixers 531 and 532, and an adding unit 534.

The phase shifting unit 533 shifts a phase of the changed frequency signal by 90 degrees. The first mixer 531 mixes the specific frequency signal output from the pulse shaping unit 510 and a signal output from the phase shifting unit 533.

The second mixer 532 mixes the specific frequency signal output from the pulse shaping unit 510 and the changed frequency signal. The adding unit 534 adds a signal output from the first mixer 531 and a signal output from the second mixer 532 and as a result outputs an RF signal.

That is, the transmitting unit 500 reduces a lot of subharmonic components included in the frequency control signal (digital data) generated by the controlling unit 700, through the pulse shaping. Furthermore, the transmitting unit 500 reduces impulse noise which is generated when directly modulating the digital data, thus minimizing a size of bandwidth and ground noise.

The pulse shaping unit 510 may include a raised cosine filter and a digital-to-analog converter, or a low pass filter.

The receiving unit 600 includes a demodulating unit 610 which demodulates a frequency of a signal received from the RFID tag by way of squaring the frequency, and a data extracting unit 620 which converts a demodulated signal output from the demodulating unit 610 into a digital signal and as a result extracts data.

The receiving unit 600, not as in FIG. 3, is configured not to receive the fixed frequency.

The demodulating unit 610 demodulates a signal transmitted from the RFID tag by way of squaring the transmitted signal. That is, the demodulating unit 610 reduces a level of amplitude which occurs at the data extracting unit 620 provided to the rear of the demodulating unit 610 by demodulating the signal transmitted from the RFID tag by way of squaring the transmitted signal.

At this point, the receiving unit, as shown in FIG. 4, may be configured to have a single path. In such a case, the signal transmitted from the RFID tag is separated as the in-phase and quadrature-phase signal, the in-phase and quadrature-phase signal is demodulated, and data is extracted. The receiving unit may be configured to have two paths. In such a case, the transmitted from the RFID tag is separated as the in-phase signal and the quadrature-phase signal, the two signals are demodulated, and as a result data is extracted.

The demodulating unit 610 includes a low noise amplifying unit 611 and a mixer 612.

The low noise amplifying unit 611 amplifies a signal transmitted from the RF tag to a low noise level. The mixer 612 mixes a frequency of a signal output from the low noise amplifying unit 611 by way of squaring the frequency.

The data extracting unit 620 includes a low pass filter 621 which passes a demodulated signal output from the demodulating unit 610 which is below a certain level, an amplifying unit 622 which amplifies a signal output from the low pass filter 621 to a specific level, a high pass filter 623 which passes an amplified signal output from the amplifying unit 622 which is above a certain level, and an analog-to-digital converter 624 which converts a signal output from the high pass filter 623 into a digital signal.

Figure 5:
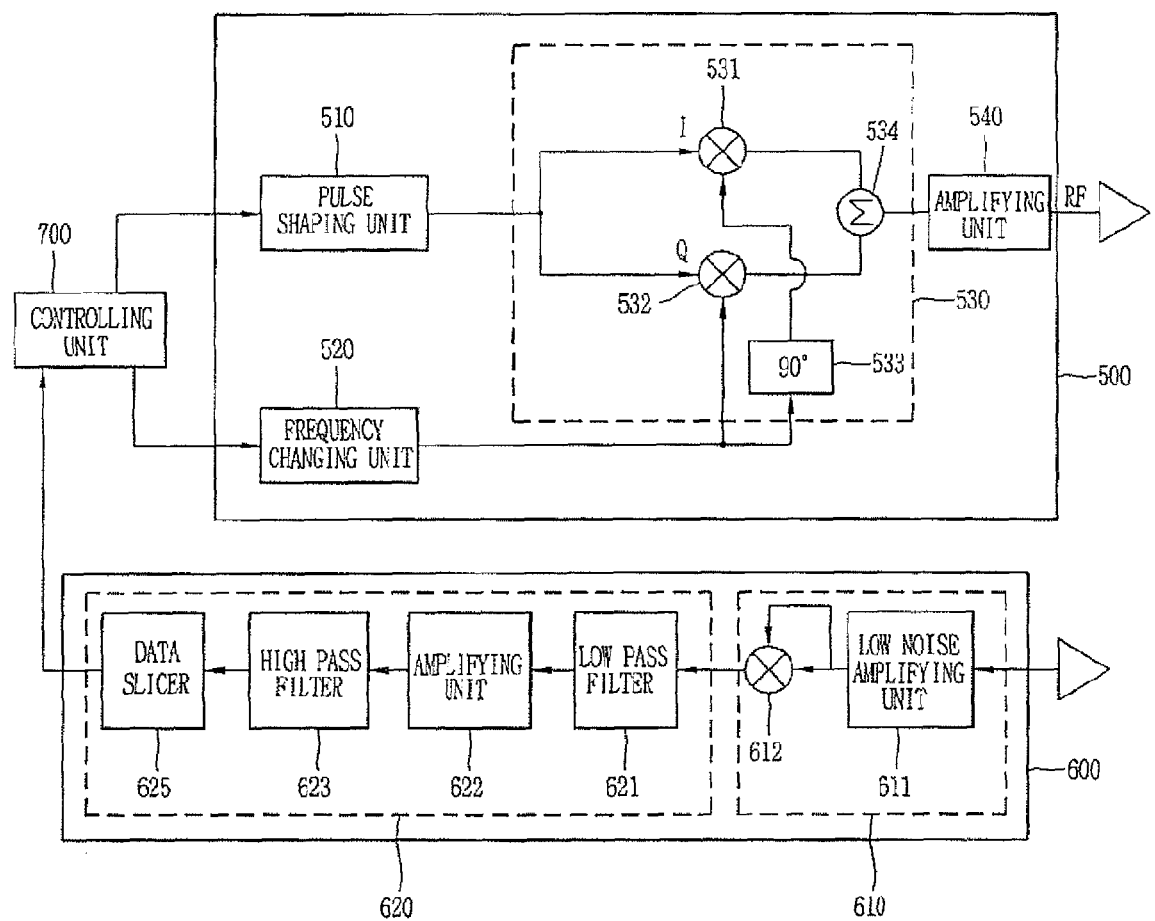
FIG. 5 is a block diagram showing a configuration of the RFID reader according to another embodiment of the RFID reader according to the present invention.

The analog-to-digital converter 624, so expensive, increases a cost for manufacturing the RFID reader. So, the data extracting unit 620 may a data slicer 325, instead of the analog-to-digital converter 624, as shown in FIG. 5.

That is, the data slicer 625 cuts off a signal output from the high pass filter 623 which is above or below a specified level and restores the signal of the specified level to a digital level. This makes it possible to reduce the size and power consumption of the receiving unit.

The RFID reader, as shown in FIG. 4. includes the pulse shaping unit which performs pulse shaping through adjusting ascending and descending times of the frequency control signal which is generated every clock, This makes it possible to minimizes a bandwidth issue occurring after modulation of carrier frequency, due to a unnecessary frequency component which is generated when the frequency control signal (digital data) output from the controlling unit 700 ascends and descends.

According to another embodiment of the present invention, the RFID reader includes the demodulating unit which demodulates the frequency transmitted from the RFID tag by way of squaring the transmitted frequency. This makes it possible to reduce a level of amplitude which occurs at the data extracting unit provided to the rear of the demodulating unit, thus improving data reception in the RFID reader.

Figure 6:
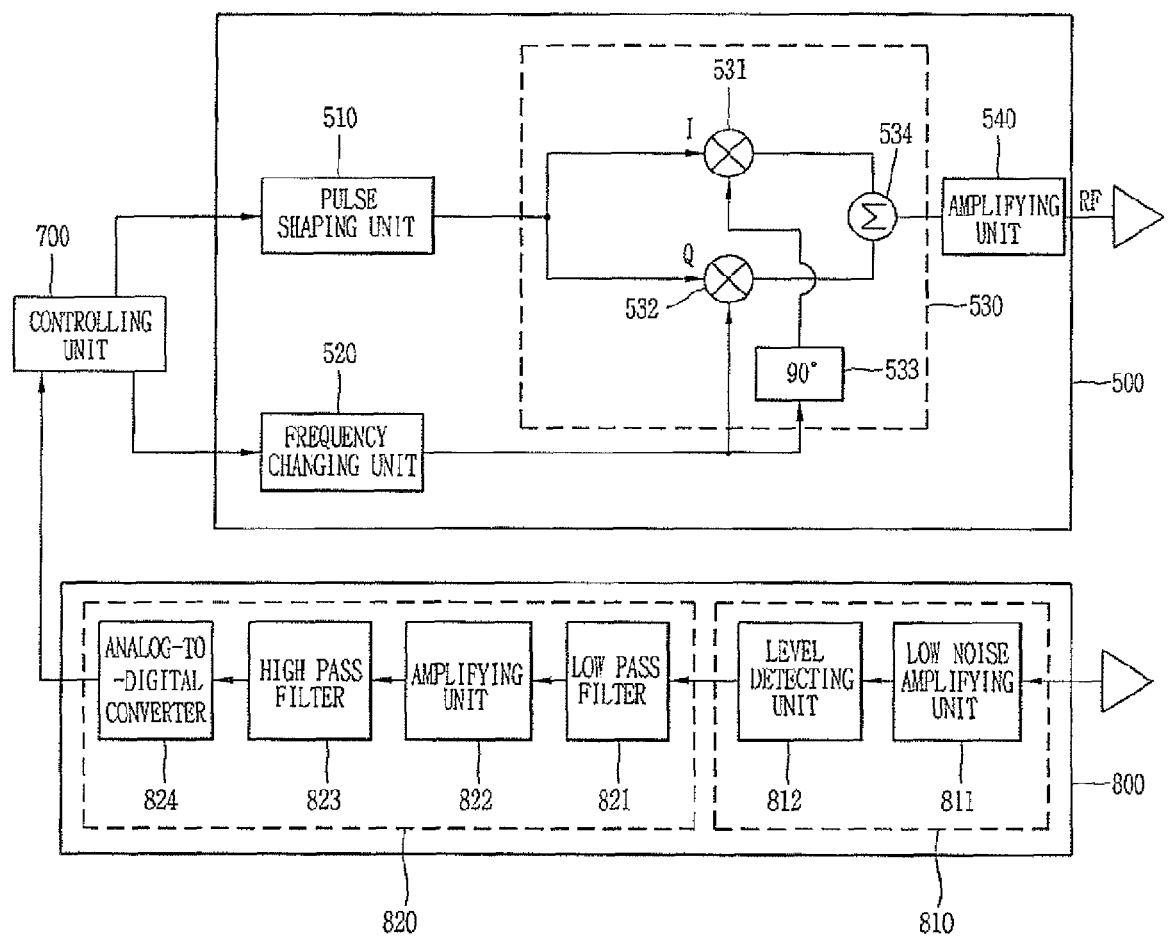
FIG. 6 is a block diagram showing a configuration of the RFID reader according to another embodiment of the RFID reader according to the present invention.

FIG. 6 is a block diagram showing another embodiment of the RF reader according to the present invention. The RFID reader, as shown in FIG. 6, includes a transmitting unit 500, a receiving unit 800, and a controlling unit 700.

The control unit 700 outputs a frequency control signal which is converted into a digital signal every clock and controls a change of a frequency for phase synchronization.

The transmitting unit 500 pulse-shapes a frequency control signal which is generated every clock, mixes a pulse-shaped specific frequency signal and a changed frequency, and as a result outputs an RF signal.

The receiving unit 600 detects a level of a signal transmitted from the RFID tag, converts a detected level of the signal into a digital signal, and as a result extracts data.

The transmitting unit 500 includes a pulse shaping unit 510, a frequency changing unit 520, a modulating unit 530, and an amplifying unit 540.

The pulse shaping unit 510 performs a pulse shaping through adjusting ascending and descending times of a frequency control signal which is generated every clock, and as a result outputs a specific frequency signal. That is, the pulse shaping unit 510 minimizes a bandwidth issue occurring after modulation of carrier frequency, due to a unnecessary frequency component which is generated when the frequency control signal (digital data) output from the controlling unit 700 ascends and descends. The frequency changing unit 520 changes a frequency according to a control signal of the controlling unit 700 to synchronize phases of the frequency control signal and the carrier frequency.

The modulating unit 530 mixes a changed carrier frequency output from the frequency changing unit 520 and a specific frequency signal output form the pulse shaping unit 510.

The amplifying unit 540 amplifies a signal output from the modulating unit 530 to a specific level and transmits an amplified signal through the antenna.

The modulating unit 530 includes a phase shifting unit 533, first and second mixers 531 and 532, and an adding unit 534.

The phase shifting unit 533 shifts a phase of the changed carrier frequency signal by 90 degrees. The first mixer 531 mixes the specific frequency signal output from the pulse shaping unit 510 and a carrier frequency I which is phase-shifted at the phase shifting unit 533.

The second mixer 532 mixes the specific frequency signal output from the pulse shaping unit 510 and ths changed carrier frequency signal. The adding unit 534 adds a signal output from the first mixer 531 and a signal output from the second mixer 532 and as a result outputs an RF signal.

That is, the transmitting unit 500 reduces a lot of subharmonic components included in the frequency control signal (digital data) generated by the controlling unit 700, through pulse shaping. Furthermore, the transmitting unit 500 reduces impulse noise which is generated when directly modulating digital data, thus minimizing a size of channel, bandwidth and ground noise.

The pulse shaping unit 510 may include a raised cosine filter and a digital-to-analog converter, or a low pass filter.

The receiving unit 800 includes a demodulating unit 810 which processes a transmission signal transmitted from the RFID tag using the RMS method, and as a result outputs a demodulated signal, and a data extracting unit 820 which processes the demodulated signal into a specific signal and as a result extracts data.

The receiving unit 800, not as in FIG. 3, is configured not to receive the fixed frequency from the transmitting unit The demodulating unit 810 demodulates a received signal using the RMS method, thus removing interference due to changes in electric power in the transmitting unit.

The demodulating unit 810 includes a low noise amplifying unit 811 and a level detecting unit 812.

The low noise amplifying unit 811 amplifies a signal transmitted from the RF tag to a low noise level. The level detecting unit 812 squares a frequency of a signal output from the low noise amplifying unit 811 and integrates a squared frequency of the signal, and outputs an average value of an integrated signal as a demodulated signal.

The data extracting unit 820 includes a low pass filter 821 which passes a demodulated signal output from the demodulating unit 810 which is below a certain level, an amplifying unit 822 which amplifies a signal output from the low pass filter 821 to a specific level, a high pass filter 823 which passes an amplified signal output from the amplifying unit 822 which is above a certain level, and an analog-to-digital converter 824 which converts a signal output from the high pass filter 823 into a digital signal.

Figure 7:
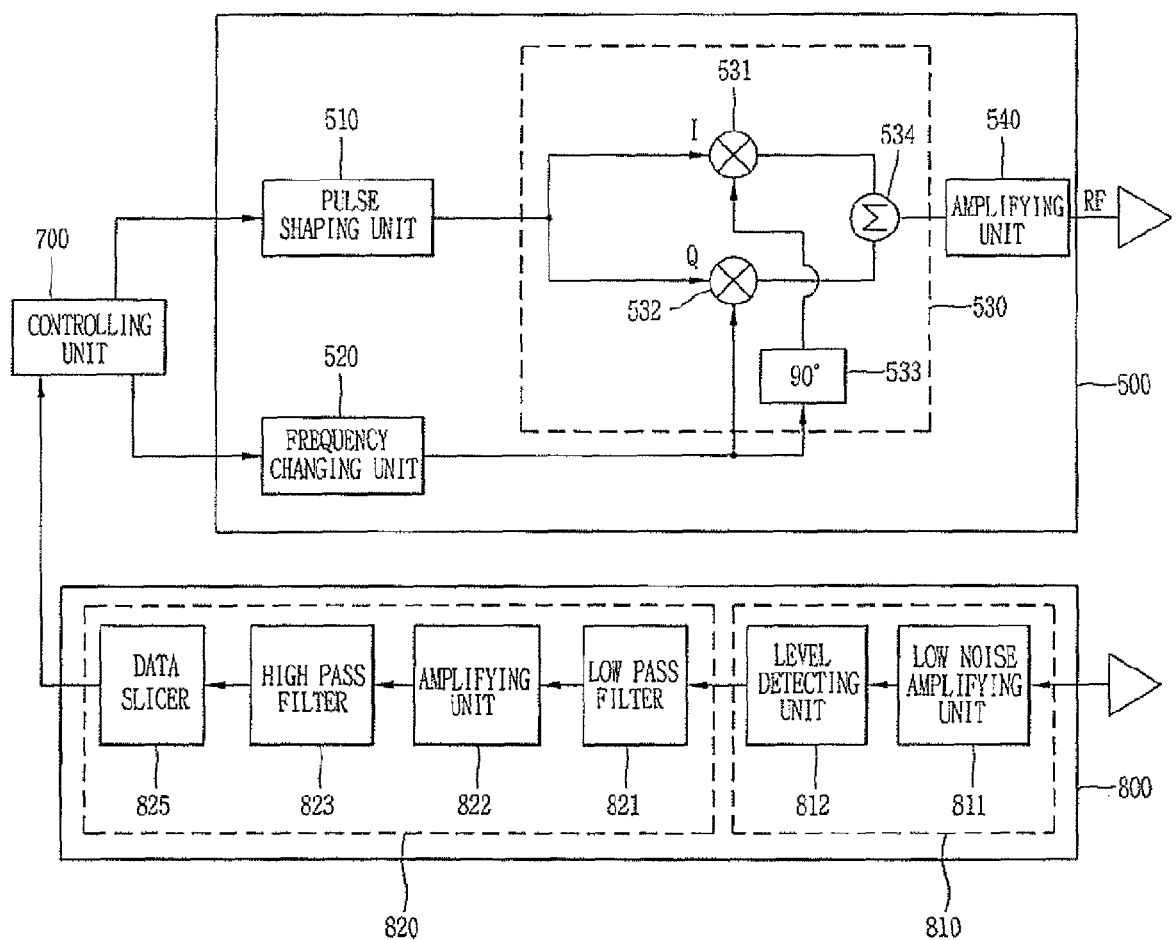
FIG. 7 is a block diagram showing a configuration of the RFID reader according to another embodiment of the RFID reader according to the present invention

The analog-to-digital converter 824, so expensive, increases a cost for manufacturing the RFID reader. So, the data extracting unit 820 may a data slicer 825, instead of the analog-to-digital converter 824, as shown in FIG. 7.

That is, the data slicer 825 cuts off a signal output from the high pass filter 623 which is above or below a specified level and restores the signal to a digital level. This makes it possible to reduce the size and power consumption of the receiving unit.

The RFID reader, as shown in FIG. 6. includes the pulse shaping unit which performs pulse shaping through adjusting ascending and descending times of the frequency control signal which is generated every clock, This makes it possible to minimizes a bandwidth issue occurring after modulation of carrier frequency, due to a unnecessary frequency component which is generated when the frequency control signal (digital data) output from the controlling unit 700 ascends and descends.

The RFID reader according to the embodiment of the present invention, as shown in FIG. 6, is not influenced by the changes in electric power in the transmitting unit, thereby improving data reception in the RFID reader. This is so because the RFID reader squares a frequency of a signal output from the low noise amplifying unit 811 and integrates a squared frequency of the signal, and outputs an average value of an integrated signal as a demodulated signal.

The REID reader according to the present invention can synthesize the frequency at a high speed using the DDFS when the transmitting unit modulates the transmission signal. This makes it possible to minimize the setting time required of the PLL method, thereby increasing the communication speed of the RFID reader using the frequency hopping and the recognition rate of the tag by the RFID reader.

The RFID reader according to the present invention performs pulse-shaping through adjusting of the ascending and descending times of the transmittion signal when the transmitting unit modulates the transmission signal. This makes it possible to minimizes a size of bandwidth due to a unnecessary frequency component which is generated when the transmission signal ascends and descends after modulation.

The RFID reader according to the present invention performs demodulation using non-zero in-phase and quadrature-phase frequency method in which a fixed frequency of the transmitting unit and a frequency of a transmission signal transmitted from an RFID tag are used, when the receiving unit demodulates the transmission signal transmitted from the RFID tag. This makes it possible to simplify the configuration of the RFID reader, thus reducing power consumption.

The RFID reader according to the present invention demodulates the transmission signal by way of squaring the transmission signal when the receiving unit demodulates the transmission signal transmitted from the RFID tag. This makes it possible to reduce a level of amplitude after demodulation and improve data reception in an RFID reader.

The RFID reader according to the present invention detects a level of the transmission signal using the RMS method and performing demodulation when the receiving unit demodulates the transmission signal transmitted from the RFID tag. This makes it possible to improve data reception in an RFID reader.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An RFID reader which reads data from an RFID tag using a wireless connection over a specified frequency bandwidth, comprising:

a transmitting unit which sequentially and cumulatively synthesizes a specific frequency signal from frequency control signals generated every clock, mixes the synthesized specific frequency signal and a fixed frequency signal, and outputs an RF signal as a result, wherein the transmitting unit comprises:

a frequency synthesizing unit which sequentially and cumulatively synthesizes the specific frequency signal from the frequency control signals generated every clock, and outputs the specific frequency signal;

a fixed frequency generating unit which generates and outputs the fixed frequency signal, which is fixed to a specified level;

a modulating unit which modulates the fixed frequency signal outputted from the fixed frequency generating unit with the specific frequency signal outputted from the frequency synthesizing unit, and outputs an RF signal as a result; and an amplifying unit which amplifies the RF signal outputted from the modulating unit to a specific level and transmits the amplified signal through an antenna, wherein the modulating unit comprises:

a first phase shifting unit which phase-shifts the specific frequency signal by 90 degrees and outputs an in-phase signal as a result;

a second phase shifting unit which phase-shifts the fixed frequency signal by 90 degrees and outputs a signal;

a first mixer which mixes the in-phase signal from the first phase shifting unit and the signal output from the second phase shifting unit;

a second mixer which mixes the fixed frequency signal and a quadrature-phase signal of the specific frequency signal; and an adding unit which adds a signal output from the first mixer and a signal output from the second mixer, and outputs the RF signal as a result.

2. The RFID reader of claim 1, wherein the frequency synthesizing unit is a direct digital frequency synthesizer.

3. The RFID reader of claim 2, wherein the direct digital frequency synthesizer comprises:

an accumulator which adds each frequency control signal generated every clock to a stored value;

a ROM which stores a digitized sine value corresponding to a phase of a signal output from the accumulator; and a digital-to-analog converter which converts a digital value outputted by the ROM into an analog value.

4. The RFID reader of claim 1, further comprising a controlling unit which outputs the frequency control signals every clock and controls the fixed frequency generating unit.

5. The RFID reader of claim 3, wherein the digital-to-analog converter performs pulse shaping by adjusting ascending and descending times of the digital value outputted by the ROM to a specific level and outputs an analog signal as the specific frequency signal as a result.

6. An RFID reader which reads data from an RFID tag using a wireless connection over a specified frequency bandwidth, comprising:

a transmitting unit which pulses-shapes a frequency control signal generated every clock in order to generate a specific frequency signal, mixes the specific frequency signal and a changed frequency, and outputs an RF signal as a result, and a controlling unit which outputs the frequency control signal every clock and controls a change of a frequency to synchronize phases of the specific frequency signal and the changed frequency;

the transmitting unit performs the pulse shaping by adjusting ascending and descending times of the frequency control signal generated every clock and outputs the specific frequency signal as a result;

the transmitting unit comprising a frequency changing unit which changes a frequency to synchronize phases of the specific frequency signal and the changed frequency in accordance with a specific control and a modulating unit which mixes the changed frequency and the specific frequency signal and an amplifying unit which amplifies a signal outputted from the modulating unit to a specific level and transmits an amplified signal through an antenna.

7. The RFID reader of claim 6, wherein the modulating unit comprises:

a phase shifting unit which phase-shifts the changed frequency by 90 degrees;

a first mixer which mixes the specific frequency signal outputted from the pulse shaping unit and a signal outputted from the phase shifting unit;

a second mixer which mixes the specific frequency signal outputted from the pulse shaping unit and the changed frequency; and an adding unit which adds a signal outputted from the first mixer and a signal outputted from the second mixer, and outputs the RF signal as a result.

8. An RFID reader which reads data from an RFID tag using a wireless connection over a specified frequency bandwidth, comprising:

a transmitting unit which pulse-shapes a frequency control signal generated every clock in order to generate a specific frequency signal, mixes the specific frequency signal and a changed frequency, and outputs an RF signal as a result; and a receiving unit which mixes a frequency of a signal transmitted from the RFID tag by way of squaring the frequency, converts the mixed signal into a digital signal, and extracts data as a result, wherein the transmitting unit comprises:

a pulse shaping unit which performs pulse shaping by adjusting ascending and descending times of the frequency control signal generated every clock, and outputs the specific frequency signal as a result;

a frequency changing unit which changes a frequency to synchronize phases of the specific frequency signal and the changed frequency in accordance with a specific control;

a modulating unit which mixes the changed frequency and the specific frequency signal; and an amplifying unit which amplifies a signal outputted from the modulating unit to a specific level and transmits an amplified signal through an antenna.

9. The RFID reader of claim 8, wherein the modulating unit comprises:

a phase shifting unit which phase-shifts the changed frequency by 90 degrees;

a first mixer which mixes the specific frequency signal outputted from the pulse shaping unit and a signal outputted from the phase shifting unit;

a second mixer which mixes the specific frequency signal outputted from the pulse shaping unit and the changed frequency; and an adding unit which adds a signal outputted from the first mixer and a signal outputted from the second mixer, and outputs the RF signal as a result.

10. The RFID reader of claim 8, wherein the receiving unit comprises:

a demodulating unit which mixes the signal transmitted from the RFID tag by way of squaring the signal; and a data extracting unit which converts a mixed signal outputted from the demodulating unit into a digital signal, and extracts the data as a result.

11. A RFID reader which reads data from an RFID tag using a wireless connection over a specified frequency bandwidth, comprising:

a transmitting unit which pulse-shapes a frequency control signal generated every clock in order to generate a specific frequency signal, mixes the specific frequency signal and a changed frequency, and outputs an RF signal as a result; and a receiving unit which detects a level of a signal received from the RFID tag, converts a detected level of the signal into a digital signal, and extracts data as a result, wherein the transmitting unit comprises:

a pulse shaping unit which performs pulse shaping by adjusting ascending and descending times of the frequency control signal generated every clock, and outputs the specific frequency signal as a result;

a frequency changing unit which changes a frequency to synchronize phases of the specific frequency signal and the changed frequency in accordance with a specific control;

a modulating unit which mixes the changed frequency and the specific frequency signal; and an amplifying unit which amplifies a signal outputted from the modulating unit to a specific level and transmits an amplified signal through an antenna.

12. The RFID reader of claim 11, wherein the receiving unit comprises:

a demodulating unit which processes a frequency of the signal received from the RFID tag using an RMS method, and detects a processed value as a demodulated signal as a result; and a data extracting unit which converts the demodulated signal into a digital signal and extracts the data as a result.

13. The RFID reader of claim 12, wherein the demodulating unit comprises:

a low noise amplifying unit which amplifies the signal received from the RFID tag to a low noise level; and a level detecting unit which squares a frequency of a signal outputted from the low noise amplifying unit, integrates the squared frequency of the signal, and outputs an average value of the integrated signal as the demodulated signal.

* * * * *